United States Patent

Chikuma et al.

[11] Patent Number: 5,112,122
[45] Date of Patent: May 12, 1992

[54] FIBER-TYPE LIGHT CONVERSION DEVICE

[75] Inventors: Kiyofumi Chikuma; Sota Okamoto, both of Saitama, Japan

[73] Assignee: Pioneer Electronic Corporation, Tokyo, Japan

[21] Appl. No.: 577,751

[22] Filed: Sep. 5, 1990

[30] Foreign Application Priority Data

Sep. 7, 1989 [JP] Japan .................................. 1-232099

[51] Int. Cl.⁵ .................................................. G02F 1/37
[52] U.S. Cl. ..................................... 359/332; 385/33; 385/122; 359/328
[58] Field of Search ............... 350/96.18, 96.29, 96.30; 307/425–430

[56] References Cited

U.S. PATENT DOCUMENTS

| | | | |
|---|---|---|---|
| 4,844,574 | 7/1989 | Chande | 350/96.18 |
| 4,892,375 | 1/1990 | Chikuma et al. | 350/96.18 |
| 4,893,888 | 1/1990 | Okazaki et al. | 350/96.30 |
| 4,919,511 | 4/1990 | Ohsawa | 350/96.29 |
| 4,961,622 | 10/1990 | Gorman et al. | 350/96.18 |

Primary Examiner—Georgia Epps
Attorney, Agent, or Firm—Wegner, Cantor, Mueller & Player

[57] ABSTRACT

A fiber-type light conversion device comprises: a fiber-type light conversion element having a core made of non-linear optical crystal for changing the wavelength of an incident light to half by the phase matching of Cerenkov radiation; and a collimating optical system for transforming an emergent light beam emitted from the light conversion element into a parallel light beam, wherein the collimating optical system has lenses having a large spherical aberration $\Delta z$. Furthermore, the quantity of spherical aberration $\Delta z$ is determined so as to satisfy the following equation of:

$$\Delta z = \Delta h / \tan \theta$$

where, on the assumption that a pair of parallel lights are incident to the collimating optical system at heights from the optical axis thereof different from each other, then $\Delta h$ represents a difference between a pair of different heights of the parallel lights and $\theta$ represents an angle of emergence of the emergent light with respect to the optical axis.

4 Claims, 2 Drawing Sheets

FIBER-TYPE LIGHT CONVERSION DEVICE

BACKGROUND OF THE INVENTION

1. Field of the Invention

The present invention relates to a fiber-type light conversion device.

2. Description of Background Information

An optical pickup device is known by which a high density writing and reading of information on and from an optical recording disk is enabled by transforming the wavelength of a laser beam emitted from a laser source to a half of the original wavelength by means of a light conversion device (a reference is directed to Japanese Patent Application Laid-Open No. 61-50122).

As the light conversion device for use in such an optical pickup device, there is a second harmonic generator (SHG) of an optical fiber type utilizing second-order non-linear optical effect. A phase matching of Cerenkov radiation system is adopted in the optical fiber-type SHG. With this system, it is possible to generate a second harmonic wave (SH wave) whose phase matching condition is attained almost automatically. The general conception of this fiber-type SHG is shown in FIGS. 1A and 1B.

In FIG. 1A, when a fundamental wave mode is propagated through the core of the fiber-type SHG with the effective refractive index of $N(\omega)$, the non-linear polarizing wave generating a SH wave is also propagated at the same phase velocity $C/N(\omega)$ (C is the speed of light). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the point A propagates through the clad and reaches to a point C after the elapse of a unit time and the angle $\theta$ is such an angle that lines AC and BC are perpendicular to each other, then the plane of the SH wave which is generated from the non-linear polarized wave becomes equal to BC, and as a result, a coherent SH wave is generated.

The condition of the phase matching is, according to the figure, as follows:

$$N(\omega) = N_{clad}(2\omega)\cos\theta \quad (1)$$

where $N_{clad}(2\omega)$ is the refractive index of the clad for the SH wave.

This in turn gives, $$N(\omega) < N_{clad}(2\omega) \quad (2)$$

This means that the SH wave is automatically generated in the direction $\theta$ where the phase matching condition is performed when at least the condition mentioned by the equation (2) is satisfied. Generally, with the refractive indexes of the clad and core with respect to the fundamental wave being $n_{clad}(\omega)$ and $n(\omega)$, and with the air as the over-layer, the condition for the fundamental wave to propagate through the core as the mode is expressed as:

$$N_{clad}(\omega) < N(\omega) < n(\omega) \quad (3)$$

Wavelength dispersion of the clad's refractive index will now be considered. Since $n_{clad}(\omega) < n_{clad}(2\omega)$, if the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of core even under the following condition.

$$N_{clad}(\omega) < n_{clad}(2\omega) < n(\omega)$$

The SH wave generated in this way is propagated in a clad mode as illustrated in FIG. 1B in which total reflection occurs repeatedly at the boundary between the clad and air. Then, the SH wave is emerged in a hollow conical shape from the end of fiber in directions making an emergent angle $\theta$ relative to the fiber's direction. The equiphase wavefront of the SH wave emitted in this way is in a conical surface with an axis on the central axis of the fiber.

In order to utilize the SH wave as a light beam for writing and reading information on and from an optical recording disk as mentioned before, it is necessary to converge the light beam emerged from the fiber-type SHG onto the recording surface of the disk in the form of a small light spot. However, since the equiphase wavefront of the emergent light of SH wave is of the conical form, it is not possible to converge the emergent light to a degree near to a diffraction limit by only using a converging lens system constructed from conventional spherical lenses and/or aspherical lenses.

Therefore, as illustrated in FIG. 2, it is conceivable to dispose a conical prism 20 having a conical surface in the optical path of the emergent light beam 11 emitted from the fiber-type SHG 10 receiving primary light 13, so that the conical equiphase wavefront of the emergent light beam 11 of SH wave can be converted into secondary light 15 having a planer equiphase wavefront by collimating the SH wave, or making it parallel, by means of the function of the conical prism 20. With this arrangement, it becomes possible to converge the conical light beam up to the diffraction limit by means of a conventional converging lens.

However, in the case that the conical prism 20 is used in the optical pickup device, when the emergent angle of the SH wave emitted from the fiber-type SHG 10 is slipped from a desired angle, and/or the interior angle of vertex of the conical prism 20 is deviated from a desired angle, the conical prism 20 is not able to accurately collimate the received light beam of SH wave. As a result, an optical path of the secondary light beam of SH wave passing though the conical prism 20 does not become in parallel to the central axis of the optical system. In this case, the SH wave passing though the conical prism 20 is converged into a light ring spot by an objective lens or converging lens 21 as shown in FIG. 3. For example, if a SH wave emerging at an emergent angle $\theta'$ of 0.01° after passing though the conical prism 20 and still having a conical equiphase wavefront, is converged by the objective lens 21 having a numerical aperture NA of 0.5 and a focal length f of 4.5 mm, then it makes a light ring spot having an inner diameter 0.16 μm by means of the approximate equation $2f \cdot \tan\theta'$ based on the geometrical optics. In view of the wave optics, if a conical prism 20 is used which has an interior angle of vertex deviated by only an angle of 0.05° from the desired angle, then the whole optical system has a wavefront aberration of 0.07λ r.m.s. As a result, it is difficult to utilize such a SH wave as a light beam for writing and reading information on and from an optical recording disk.

In this way, it is necessary to use a conical prism 20 having the interior angle of vertex with a great accuracy according to the emergent angle of the SH wave emitted from the fiber-type SHG 10 in order to collimate the SH wave. The production of the conical prism conical prism 20 is difficult because of the conical shape thereof as mentioned above, and the alignment between the SHG and the conical prism 20 is also difficult.

SUMMARY OF THE INVENTION

An object of the present invention is to provide a fiber-type light conversion device which is adapted such that the SH wave is collimated by means of an optical part without any conical prism 20.

The fiber-type light conversion device according to the present invention has a construction in which a fiber-type light conversion element has a core made of non-linear optical crystal for changing the wavelength of an incident light by means of non-linear optical effect; and a collimating optical system transforms an emergent light beam emitted from said light conversion element into a parallel light beam, wherein said collimating optical system has lenses having a large spherical aberration.

In such a fiber-type light conversion device, the emergent SH wave emitted from the fiber-type SHG 10 is collimated into a parallel light beam by means of the optical lens system having a large spherical aberration.

DETAILED DESCRIPTION OF THE PREFERRED EMBODIMENT

The preferred embodiment of the present invention will be explained with reference to the accompanying drawings hereinafter.

Figure 1A:
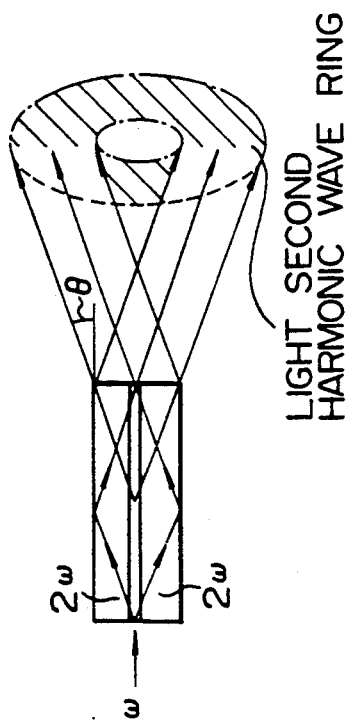
FIGS. 1A and 1B are diagrams for explaining the conception of the Cerenkov radiation system phase matching SHG.
Figure 1B:
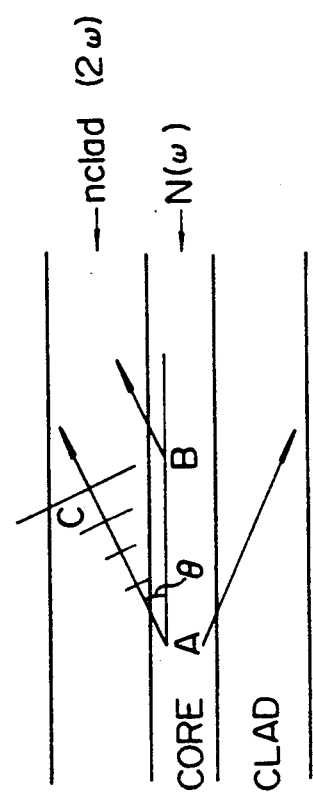
Figure 3:
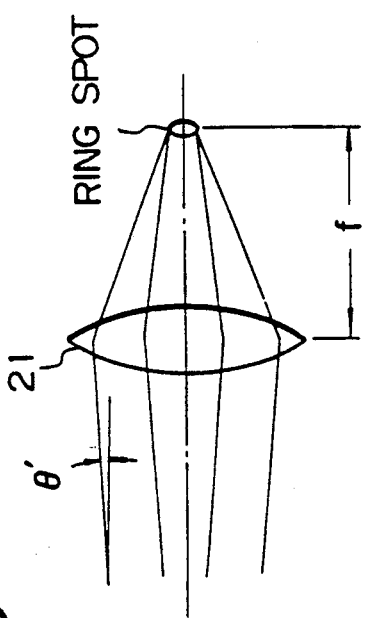
FIG. 3 is a diagram for explaining to make a resulting light ring by an objective lens after collimating the SH wave which is not in parallel to the central axis of the optical system.
Figure 2:
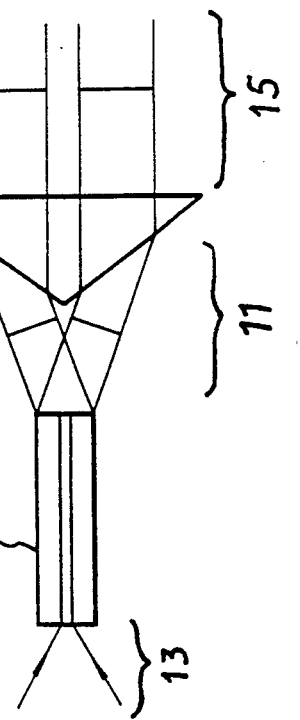
FIG. 2 is a diagram for explaining the conception of collimating the SH wave by means of a conical prism.
Figure 4:
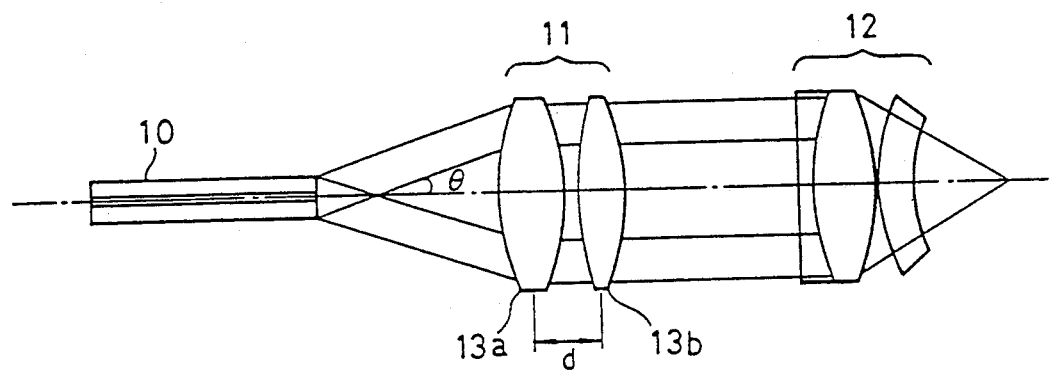
FIG. 4 is a diagram showing the structure of an embodiment of the light conversion device according to the present invention.

In FIG. 4, a laser beam generated from a laser source such as a semiconductor laser or YAG laser (not shown) is incident through a divergent optical system and a converting optical system (not shown) onto the inlet end surface of a fiber-type SHG 10. This SHG 10 comprises a core made of a non-linear optical crystal and a cladding layer or clad surrounding the core, the core generating a SH wave which has a half wavelength of the incident light beam by means of the secondary non-linear optical effect thereof. A collimating optical system 11 and converging optical system 12 are disposed in turn at an emergent side of the fiber-type SHG 10. The collimating optical system 11 collimates a secondary light of SH wave having a conical wavefront emitted from the fiber-type SHG 10. An optical lens system having a large spherical aberration is used for the collimating optical system 11. The converging optical system 12 converges the incident light beam up to a diffraction limit. Another optical system whose spherical aberration is preferably amended less than the diffraction limit, is used for the converging optical system 12.

Whereas it is considered that, when the emergent light beam of SH wave is emitted from the fiber-type SHG 10 with a non-linear optical crystal core in accordance with the Cerenkov radiation phase matching system, such an emergent light is equal to a bundle of light rays emitted from light sources arranged in a line on the optical axis in a direction making an angle $\theta$ with respect to the optical axis of the fiber-type SHG 10. This is the reverse phenomenon that parallel lights enter into a conical prism in parallel to the optical axis thereof so that the emergent light becomes a bundle of lights converged within a certain section of the optical axis. Therefore, the conical prism is used for the collimation of the emergent light emitted from the fiber-type SHG 10.

Figure 5:
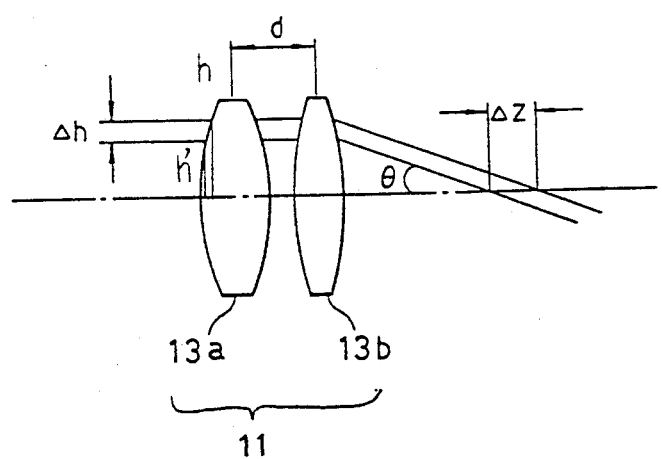
FIG. 5 is a diagram for explaining the function of the collimating lens system used in the device shown in FIG. 4.

In view of this reverse phenomenon, the function of the conical prism is to convert the parallel light entering thereinto at a height h from the optical axis into a light with an angle $\theta$ with respect to the optical axis. In other words, this function of the conical prism is equal to that of the collimating optical system 11 as shown in FIG. 5. In this case, when a pair of parallel incident lights are respectively incident into the collimating optical system 11 at the heights h, h' from the optical axis thereof, then a difference $\Delta h$ between a pair of different heights h, h' of the parallel incident lights, is related to an angle $\theta$ of the parallel emergent lights with respect to said optical axis as follows:

$$\Delta h = \Delta z \cdot \tan\theta$$

where $\Delta z$ represents a distance between two points at which the emergent lights intersect the optical axis respectively. It is apparent that if this condition of light described above is sufficed, the collimation of the emergent light emitted from the fiber-type SHG 10 is conducted without using any conical lens. This relational equation above mentioned means that the collimating optical system 11 preferably has a quantity of spherical aberration $\Delta z$ which is determined so as to satisfy the following equation of:

$$\Delta z = \Delta h / \tan\theta.$$

There is obtained the collimating optical system 11 having the same function as the conical lens by utilizing a lens system having such a quantity of spherical aberration $\Delta z$ and comprising a plurality of spherical lenses instead of the conical lens. The equation mentioned above is preferably sufficed at least one ring portion where said emergent light is emerged on the collimating optical system 11.

In FIG. 4, the collimating optical system 11 comprises one pair of single lenses 13a, 13b separately disposed on the optical axis thereof in which the single lenses 13a, 13b are movable to each other so that a distance d between said single lenses becomes variable. By varying the distance d in response to a deviation of the emergent angle $\theta$ of the emergent light emitted from the fiber-type SHG 10, the spherical aberration is optimized in the collimating optical system 11, so that the condition of the convergence of light is adjustable to a desirable value. If the emergent angles $\theta$ of emergent lights of the resulting fiber-type SHGs are different from each other due to the tolerance of the manufacture thereof, the pertinent collimation is accomplished by means of the adjustment of the distance d between said single lenses 13a, 13b. In the other words, for an optimize collimation, it is not necessary to select one of various conical prisms each having a different vertical angle in accordance with various fiber-type SHGs. This is advantageous in the practice.

As will be appreciated from the foregoing description, the fiber-type light conversion device according to the present invention has a construction in which the collimating optical system having a large spherical aberration collimates the emergent light emitted from the fiber-type SHG into a parallel light beam. Therefore, the secondary light of SH wave emitted from the fiber-type SHG can be easily collimated without using any conical lens with the difficult of manufacture in which the alignment between the SHG and the conical prism is also difficult.

What is claimed is:

1. A fiber-type light conversion device comprising:
a fiber-type light conversion element having a core made of non-linear optical crystal for changing the wavelength of an incident light by means of non-linear optical effect; and
a collimating optical system for transforming an emergent light beam emitted from said light conversion element into a parallel light beam, wherein said collimating optical system has lenses having a large spherical aberration.

2. A device as set forth in claim 1, wherein said collimating optical system is constructed so that a quantity of spherical aberration $\Delta z$ is determined so as to satisfy the following equation of:

$$\Delta z = \Delta h / \tan\theta$$

where, on the assumption that a pair of parallel lights are incident to said collimating optical system at heights from the optical axis thereof different from each other, then $\Delta h$ represents a difference between a pair of different heights of the parallel lights and $\theta$ represents an angle of emergence of said emergent light with respect to said optical axis.

3. A device as set forth in claim 2, wherein said collimating optical system has, at least one ring portion where said emergent light is emerged therefrom, a spherical aberration having a quantity of spherical aberration $\Delta z$ is determined by said equation of:

$$\Delta z = \Delta h / \tan\theta$$

4. A device as set forth in claim 1, wherein said collimating optical system has at least one pair of lenses is movable to each other so that a distance between said lenses is variable.

* * * * *